(12) United States Patent
Pruitt et al.

(10) Patent No.: US 8,695,316 B2
(45) Date of Patent: Apr. 15, 2014

(54) FIXED ROTARY KNIFE WITH MULTIPLE CUTTING SURFACES

(75) Inventors: Martin E. Pruitt, Hesston, KS (US);
Brendon Nafziger, Canton, KS (US);
James W. Schroeder, Newton, KS (US)

(73) Assignee: AGCO Corporation, Duluth, GA (US)

( * ) Notice: Subject to any disclaimer, the term of this patent is extended or adjusted under 35 U.S.C. 154(b) by 218 days.

(21) Appl. No.: 13/399,664

(22) Filed: Feb. 17, 2012

(65) Prior Publication Data

US 2012/0210693 A1    Aug. 23, 2012

Related U.S. Application Data

(60) Provisional application No. 61/444,825, filed on Feb. 21, 2011.

(51) Int. Cl.
*A01D 34/73* (2006.01)

(52) U.S. Cl.
USPC ............................................. 56/255; 56/295

(58) Field of Classification Search
USPC .................. 56/10.4, 12.7, 255, 295, DIG. 16, 56/DIG. 17, DIG. 20
See application file for complete search history.

(56) References Cited

U.S. PATENT DOCUMENTS

| 2,592,755 | A | * | 4/1952 | Soenksen | 56/295 |
| 2,627,156 | A | | 2/1953 | Carter et al. | |
| 2,697,323 | A | * | 12/1954 | Horn | 56/295 |
| 2,716,323 | A | * | 8/1955 | Ford | 56/295 |
| 2,786,322 | A | | 3/1957 | McEvers | |
| 2,859,582 | A | * | 11/1958 | Babcock | 56/295 |
| 3,507,104 | A | | 4/1970 | Kline et al. | |
| 3,581,482 | A | | 6/1971 | Reber et al. | |
| 4,594,843 | A | * | 6/1986 | Andersson et al. | 56/295 |
| 4,922,698 | A | * | 5/1990 | Taylor | 56/295 |
| 5,463,852 | A | * | 11/1995 | O'Halloran et al. | 56/6 |
| 6,158,201 | A | | 12/2000 | Pruitt et al. | |

* cited by examiner

*Primary Examiner* — Alicia Torres

(57) ABSTRACT

A crop harvesting header has a cutter bed to cut crop material as the harvester advances through a field. The cutter bed includes a plurality of rotatable cutters having knives extending from opposing ends of the cutters. Each cutter is ninety degrees out of phase with respect to its adjacent cutters such that the circular paths of travel of the knives of adjacent cutters overlap one another, and adjacent cutters rotate in opposite directions. Each cutter has a generally elliptical knife carrier, and a pair of knives at opposites ends of the carrier, wherein a portion of each knife extends beyond the end of the carrier to expose a cutting surface to sever the standing crop. The cutter also includes an attachment device connecting each knife to the knife carrier, and a fixed stop restricting rotational movement of the knife with respect to the carrier about the attachment device.

5 Claims, 4 Drawing Sheets

FIXED ROTARY KNIFE WITH MULTIPLE CUTTING SURFACES

CROSS REFERENCE TO RELATED APPLICATIONS

The present application claims the benefit of co-pending U.S. provisional application entitled "FIXED ROTARY KNIFE WITH MULTIPLE CUTTING SURFACES", having Ser. No. 61/444,825, filed Feb. 21, 2011.

BACKGROUND OF THE INVENTION

1. Field of Invention

This invention relates to crop harvesting machines of the type that use rotary cutters, and more particularly to rotary cutters having fixed knives with multiple cutting surfaces such that the knives may be repositioned to expose a different cutting surface which may be used to sever the standing crop.

2. Description of Related Art

Wide cut rotary harvesters are commonly used to sever standing crops in the field and deposit the crop back onto the ground in the form of a windrow or swath to sever. It is known for harvesters to use a rotary style cutter bed located adjacent the front of the header framework for severing crop from the ground as the harvester moves across a field. For example, U.S. Pat. No. 6,158,201 to Pruitt et al. entitled "Rotary Mower Conditioner Having Improved Crop Flow" discloses a cutter bed that includes a series of rotary cutters spaced across the path of travel of the harvester and each being rotatable about its own upright axis. Typically, each of the cutters includes a generally elliptical, metal knife carrier and a pair of free swinging knives at opposites ends of the carrier.

Energy crops, such as sugar cane, grow in large clumps and the free swinging knives have a tendency to retract, resulting in poor cut off and excessive wear to the knife mounting hole and mounting components. It is desirable to have a clean cut with a minimum amount of shattering of the stubble. Based on the foregoing, it would be desirable to have a rotary header with improved cutters, and also having knives that provide multiple cutting surfaces.

OVERVIEW OF THE INVENTION

In one embodiment, the invention is directed to a cutter bed for a rotary mower used to sever standing crop as the cutter bed advances through a field. The cutter bed includes a plurality of rotatable cutters having knives extending from opposing ends of the cutters. Each cutter is ninety degrees out of phase with respect to its adjacent cutters such that the circular paths of travel of the knives of adjacent cutters overlap one another, and adjacent cutters rotate in opposite directions. Each cutter has a generally elliptical knife carrier, and a pair of knives at opposites ends of the carrier, wherein a portion of each knife extends beyond the end of the carrier to expose a cutting surface to sever the standing crop. The cutter also includes an attachment device connecting each knife to the knife carrier, and a fixed stop restricting rotational movement of the knife with respect to the carrier about the attachment device.

In one embodiment, the fixed stop is a clip having a body portion configured to fit adjacent to and attach with an underside of the knife carrier and downward extending flanges at each end. A respective one of the downward extending flange abuts an inward surface of its respective knife to impede rotational movement of the knife. The fixed stop is a shearing member configured to fail before the attachment device if the knife strikes a non-crop object during cutting operations such that the fixed stop fails and permits rotational movement of the knife with respect to the carrier about the attachment device.

In another embodiment, each knife has three sides, with each side having at least one cutting surface. A portion of each knife extends beyond the end of the carrier to expose a cutting surface to sever the standing crop. The attachment device permits the knife to be removed from the carrier and repositioned such that a cutting surface on one of the other two sides is exposed for cutting operations. Only an outer portion of a leading side of the knife extends out of the carrier and is effective as a cutting surface and the cutter rotates. The knife is configured to be removed from the carrier and flipping and then attached to a carrier of a cutter in the cutter bed of opposite rotation to obtain additional usage of cutting surfaces such that the knife having two cutting surfaces on each side for a total of six different cutting surfaces.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
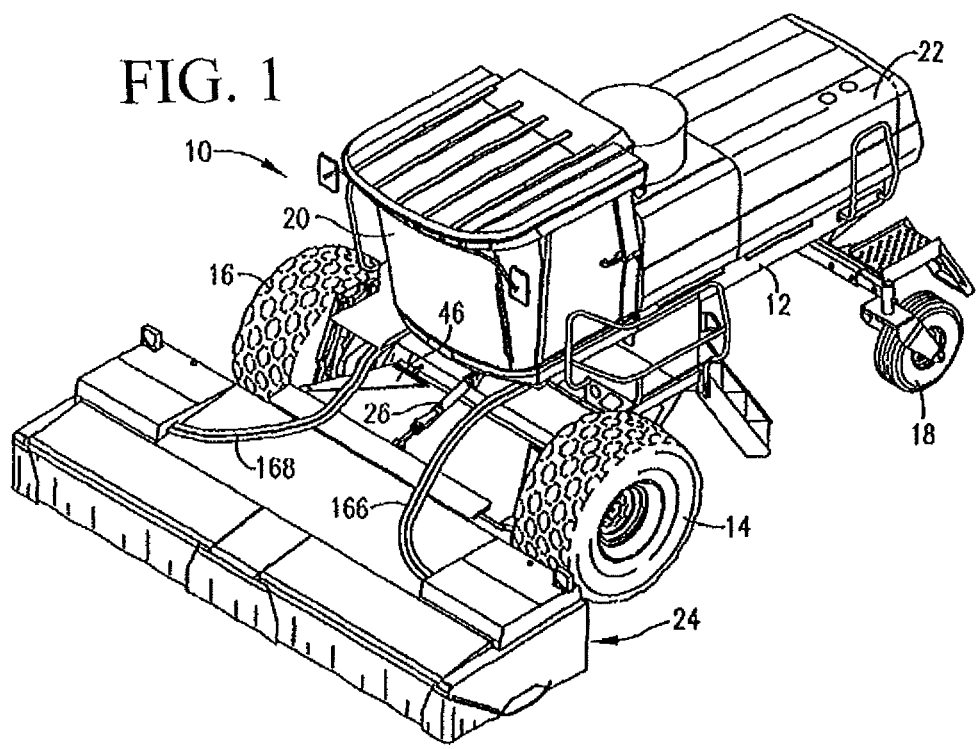
FIG. 1 shows a perspective view of an example embodiment of a self-propelled windrower that may employ a rotary mower header in accordance with the invention.

FIG. 1 shows a harvester in the form of a self-propelled windrower 10 operable to mow and collect standing crop in the field, condition the cut material as it moves through the machine to improve its drying characteristics, and then return the conditioned material to the field in a windrow or swath. Although the invention will be described using a self-propelled windrower, one skilled in the art will understand that any self-propelled or pull-type rotary mower may utilize the invention disclosed herein. The windrower 10 may include a chassis or frame 12 supported by wheels 14 for movement across a field to be harvested. The frame 12 carries a cab 20, within which an operator controls operation of the windrower 10, and a rearwardly spaced compartment 22 housing a power source (not shown) such as an internal combustion engine. A harvesting header 24 is supported on the front of the frame 12 in a manner understood by those skilled in the art.

The header 24 may be similar to that disclosed in U.S. Pat. No. 6,158,201 to Pruitt et al. entitled "Rotary Mower Conditioner Having Improved Crop Flow" which is assigned to the assignee of the present invention and incorporated by reference in its entirety herein. The header 24 may be configured as a modular unit and consequently may be disconnected for removal from the frame 12. Accordingly, the frame 12 is not dedicated only to those harvesting operations provided by the header 24, but may carry other modular headers designed to perform different harvesting operations. Similarly, the header 24 may be removed from the frame 12 and installed on other variously constructed mobile frames, such as a pull-type implement. In this respect, it will be appreciated that the principles of the present invention are equally applicable to pull-type harvesting machines and machines dedicated only to mowing and conditioning crop.

Figure 2:
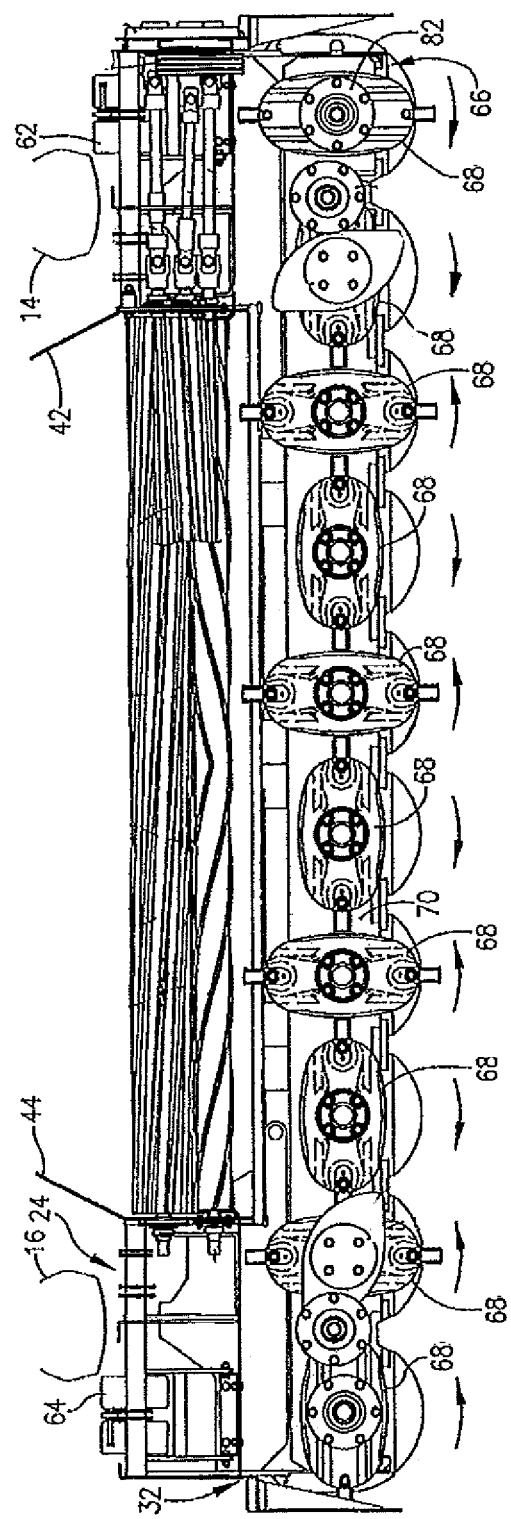
FIG. 2 shows a top view of an example embodiment of a harvesting rotary mower header, with parts being broken away to illustrate the cutter bed.

Turning now to FIG. 2, the header 24 may have a generally open, box-like framework 32 that includes a pair of tubular cross beams 34 and 36 supported at opposite ends by side plates 38 and 40. A pair of shield supports 42 and 44 are fixed relative to the side plates 38 and 40 to project rearwardly therefrom. The shield supports 42, 44 converge rearwardly and support the windrow forming shields, generally denoted by the reference numeral 46 in FIG. 1. A pair of laterally extending, upright outboard plates 48 and 50 project outwardly beyond the cross beams 34 and 36, with the inner ends of the outboard plates 48 and 50 defining therebetween the front boundary of a discharge opening 52 through which cut crop passes as it moves rearwardly in the header 24.

A laterally extending crop cutting assembly in the form of a low profile, rotary style cutter bed 66 is located adjacent the front of the header framework 32 for severing crop from the ground as the harvester 10 moves across a field. The illustrated cutter bed 66 includes a series of ten rotary cutters 68 spaced across the path of travel of the harvester 10 and each being rotatable about its own upright axis. However, one skilled in the art will understand that a larger or smaller number of cutters 68 could be provided without departing from the scope of the invention. The cutters 68 are rotatably supported on an elongated, flat gear case 70 extending the full length of the cutter bed 66 to present a substantially planar cutting zone, within which crop is severed from the ground. The gear case 70 may contain a train of flat spur gears (not shown) that are operably engaged with one another and thus serve to distribute driving power between one another, although other forms of power distribution means may be used within the case 70 (e.g., shafts and bevel gears, belts and pulleys, or chains and sprockets).

Each of the cutters 68 may be ninety degrees out of phase with respect to the adjacent cutters, inasmuch as the circular paths of travel of the knives of adjacent cutters overlap one another and must be appropriately out of phase in order to avoid striking each other. Due to the positive mechanical drive connection between the cutters 68 through the spur gears in the case 70, the cutters remain properly in phase with one another. It will also be appreciated that the spur gears are arranged in such a manner that the inner cutters (excluding the outermost cutters) are divided into cooperating pairs, with the two cutters of each pair rotating in opposite directions. In other words, the second and third cutters 68 as viewed from the left end of the cutter bed 66 in FIG. 2 rotate toward one another across the front of the cutter bed 66, as do the fourth and fifth cutters, the sixth and seventh cutters, and the eighth and ninth cutters.

Figure 3:
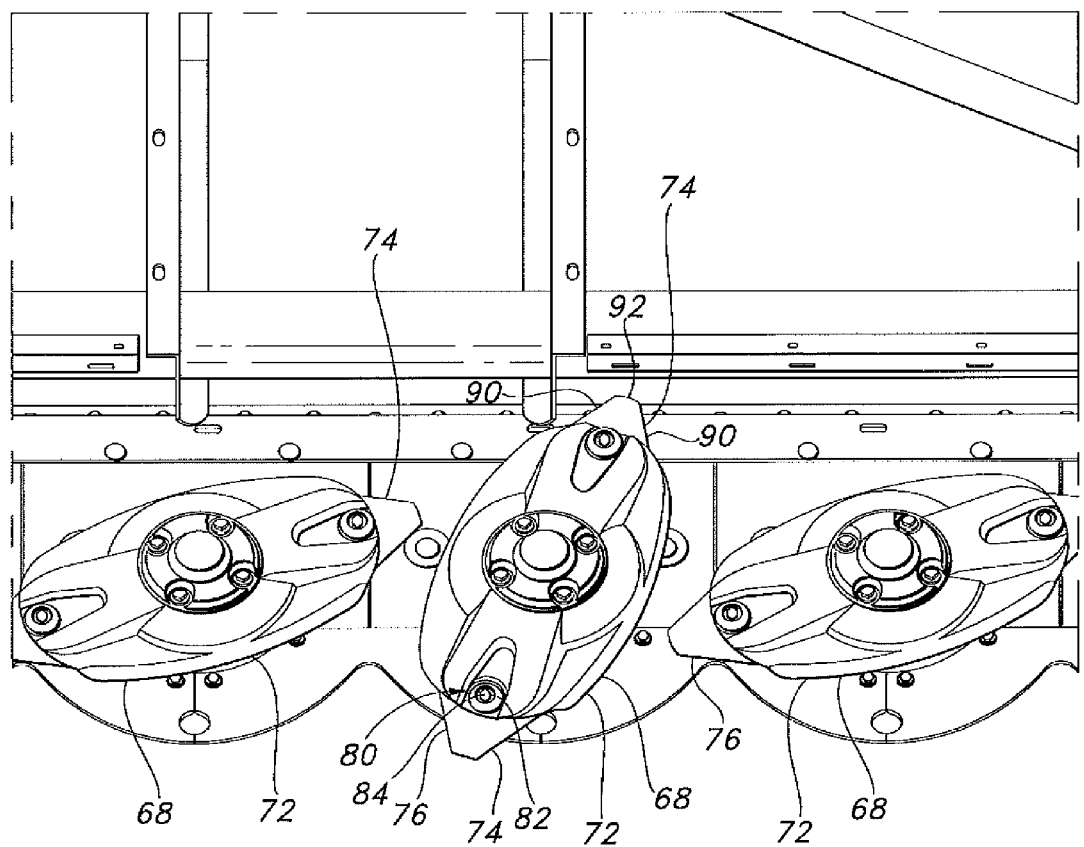
FIG. 3 shows an enlarged perspective view of a portion of the cutter bed, particularly illustrating three cutters.
Figure 4:
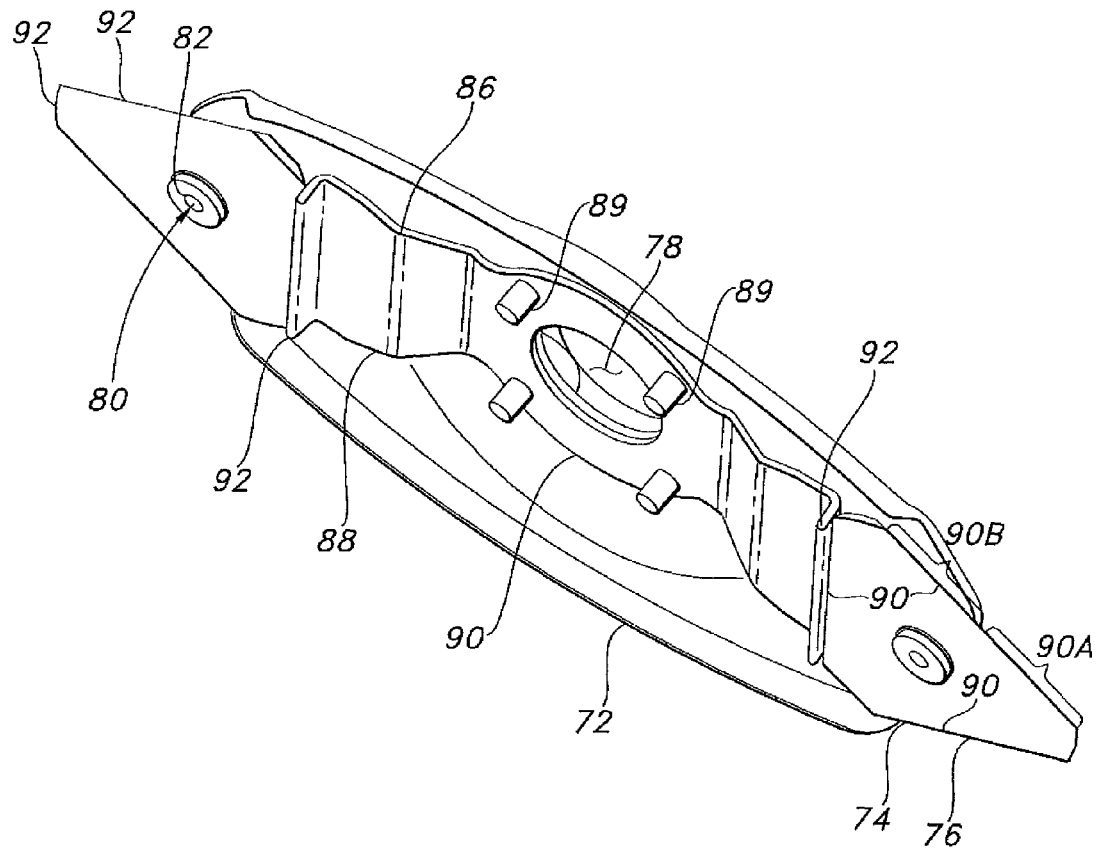
FIG. 4 shows an enlarged, perspective view of the underside side of an example embodiment of a cutter.

It will be appreciated that the cutters 68 are similar in construction. For the sake of brevity, only one of the cutters 68 will be described in detail herein with the understanding that the remaining cutters are similarly constructed. Turning now to FIG. 3, each of the cutters 68 may include a generally elliptical, metal knife carrier 72, and a pair of knives 74 at opposites ends of the carrier 72. A portion of each knife 74 extends beyond the end of the carrier 72 to expose a cutting surface 76 that is used to sever the standing crop as the rotating cutter 68 advances through the field. As best seen in FIG. 4, the carrier 72 has a center mounting hole 78 used to mount the cutter 68 on the gear case 70 (FIG. 2) as is well known in the art using sound engineering judgment.

Each knife 74 is attached to the carrier 72 with an attachment device 80. In one embodiment, the attachment device 80 comprises a bolt, screw or other suitable fastening device 82 positioned in a central portion of the knife 74 and aligned with an attachment hole 84 in the carrier 72. According to the invention, a fixed stop 86 attached to the carrier 72 interacts with the knife 74. The fixed stop 86 restricts rotational movement of the knife 74 with respect to the carrier 72 about the attachment device 80. In one illustrated embodiment, the fixed stop 86 comprises a clip 88 having a body portion 90 configured to fit adjacent to and attach with the underside of the carrier 72 on pegs 89 and having a downward extending flange 92 at each end that contacts an inward surface of the knife 74. However, one skilled in the art will understand that other fixed stops 86 configured to restrict rotational movement of the knife 74 with respect to the carrier 72 may be used with sound engineering judgment. For example, the carrier 72 may have two fixed stop clips, with each clip interacting with one of the knives 74. Also, the fixed stop 86 may include tabs or detents that extend out from the carrier 72 that abut surfaces of the knife 74 or are inserted into holes or grooves in the knife 74.

Desirably, the fixed stop 86 is designed to fail before the attachment device 80 if the knife 74 strikes a rock or other object during cutting operations such that the fixed stop 86 acts as a shearing member. If the knife 74 strikes a rock, the fixed stop 86 would fail and permit rotational movement of the knife 74 with respect to the carrier 72 about the attachment device 80 rather than cause the attachment device 80 to fail. Thus, the attachment device 80 retains the knife 74 on the carrier 72 after a rock strike and potential loss of the knife 74 in the field is minimized. Also after a rock strike, the operator needs only to replace the fixed stop 86 and not replace a lost or broken knife 74.

In one embodiment, the knife 74 has a generally triangular shape containing multiple cutting surfaces 76. The triangular embodiment has three sides 94 joined at truncated corners 96. Each side 94 contains at least one cutting surface 76. In use, the cutting surface 76 on the leading side of the knife 74 with respect to the direction of rotation of the cutter 68 is used to cut the crop material as the cutter bed 66 advances through the field. The attachment device 80 permits the knife 74 to be removed from the carrier 72 and repositioned such that a cutting surface 76 on one of the other two sides 94 is exposed for cutting operations. As can be seen, only the outer portion 94A of the leading side 94 of the knife 74 extends out of the carrier 72 and is effective as a cutting surface. Desirably, the knife 74 is also reversible by flipping the knife 74 upside and attached to a carrier 72 of cutter 68 of opposite rotation to obtain additional usage of cutting surfaces 76. For example, the knives 74 of the second cutter 68 from the left in FIG. 2 can be flipped and used on the third cutter 68. In this new orientation, the portion 94B will be on the leading side of the knife 74 and extend out of the carrier 72 and be used to cut the standing crop. Thus, the triangular shape embodiment provides a knife 74 having two cutting surfaces 76 (i.e., portion 94A and 94B) on each side 94, for a total of six different cutting surfaces 76. However, one skilled in the art will understand that the knife 74 may have other shapes that provide multiple cutting surfaces. For example, the knife 74 may have the general shape of a parallelogram with up to eight cutting surfaces 76. Desirably, the shape will have truncated corners 92 as shown with the triangular embodiment in FIG. 4.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. A cutter bed for a rotary mower used to sever standing crop as the cutter bed advances through a field, the cutter bed comprising a plurality of rotatable cutters having knives extending from opposing ends of the cutters, wherein each cutter is ninety degrees out of phase with respect to its adjacent cutters such that the circular paths of travel of the knives of adjacent cutters overlap one another, and wherein adjacent cutters rotate in opposite directions, each cutter comprising:
   a generally elliptical knife carrier;
   a pair of knives at opposites ends of the knife carrier, wherein a portion of each knife extends beyond the respective end of the knife carrier to expose a cutting surface to sever the standing crop;
   an attachment device rotatably connecting each knife to the knife carrier; and
   a fixed stop restricting rotational movement of the knives with respect to the knife carrier about the attachment device, wherein the fixed stop comprises a clip having a body portion configured to fit adjacent to and attach with an underside of the knife carrier and downward extending flanges at each end, a respective one of said downward extending flange abutting an inward surface of its respective knife to impede rotational movement of said knife, wherein the fixed stop is a shearing member configured to fail before the attachment device when at least one of the knives strikes a non-standing crop object during cutting operations such that the fixed stop fails and permits rotational movement of at least one of the knives with respect to the knife carrier about the attachment device.

2. The cutter bed of claim 1 wherein each of the knives has three sides, with each side comprising at least one cutting surface.

3. The cutter bed of claim 2 wherein the attachment device permits each of the knives to be removed from the carrier and repositioned such that a cutting surface on one of the other two sides is exposed for cutting operations.

4. The cutter bed of claim 3 wherein only an outer portion of a leading side of each of the knives extends out of the knife carrier and is effective as a cutting surface as the cutter rotates, wherein each knife is configured to be removed from the knife carrier and flipped and then attached to a knife carrier of one of the cutters in the cutter bed of opposite rotation to expose additional cutting surfaces such that each knife has two cutting surfaces on each of its three side for a total of six different cutting surfaces.

5. A crop harvesting rotary header configured for attachment to a frame of a harvesting machine comprising the cutter bed of claim 1.

\* \* \* \* \*